(12) United States Patent
Jayaratne

(10) Patent No.: US 6,871,784 B2
(45) Date of Patent: Mar. 29, 2005

(54) SECURITY IN MAG-STRIPE CARD TRANSACTIONS

(75) Inventor: Yohan R. Jayaratne, Costa Mesa, CA (US)

(73) Assignee: Trijay Technologies International Corporation, Newport Beach, CA (US)

( * ) Notice: Subject to any disclaimer, the term of this patent is extended or adjusted under 35 U.S.C. 154(b) by 285 days.

(21) Appl. No.: 09/779,113

(22) Filed: Feb. 7, 2001

(65) Prior Publication Data

US 2002/0145050 A1 Oct. 10, 2002

(51) Int. Cl.$^7$ .............................. G06K 7/08; G06K 5/00
(52) U.S. Cl. ....................................... 235/449; 235/380
(58) Field of Search .................................. 235/449, 493, 235/487, 380, 375, 382; 360/2; 340/5.8–5.86

(56) References Cited

U.S. PATENT DOCUMENTS

| | | | | |
|---|---|---|---|---|
| 4,094,462 A | * | 6/1978 | Moschner | 235/380 |
| 4,568,936 A | * | 2/1986 | Goldman | 340/5.86 |
| 5,365,586 A | | 11/1994 | Indeck et al. | |
| 5,408,505 A | | 4/1995 | Indeck et al. | |
| 5,428,683 A | | 6/1995 | Indeck et al. | |
| 5,546,462 A | * | 8/1996 | Indeck et al. | 713/176 |
| 5,587,654 A | | 12/1996 | Indeck et al. | |
| 5,625,689 A | | 4/1997 | Indeck et al. | |
| 5,740,244 A | | 4/1998 | Indeck et al. | |
| 5,760,386 A | * | 6/1998 | Ward | 235/493 |
| 5,790,662 A | * | 8/1998 | Valerij et al. | 380/2 |
| 6,012,636 A | * | 1/2000 | Smith | 235/380 |
| 6,098,881 A | | 8/2000 | DeLand, Jr. et al. | |

* cited by examiner

*Primary Examiner*—Michael G. Lee
*Assistant Examiner*—Jamara A. Franklin
(74) *Attorney, Agent, or Firm*—Natan Epstein

(57) ABSTRACT

Security of transactions based on electronically readable cards is enhanced by encoding the card with data representative of particulate microstructure of the card's magnetic stripe as well as biometric data corresponding to the authorized card user. Optionally, the card is also encoded with image scan data representative of a photograph or other significant portion of the card. The encoded data is verified against live data read at a transaction site thereby to associate the particular card to the physical person presenting the card.

40 Claims, 4 Drawing Sheets

Local Validation Of Card At Transaction Site

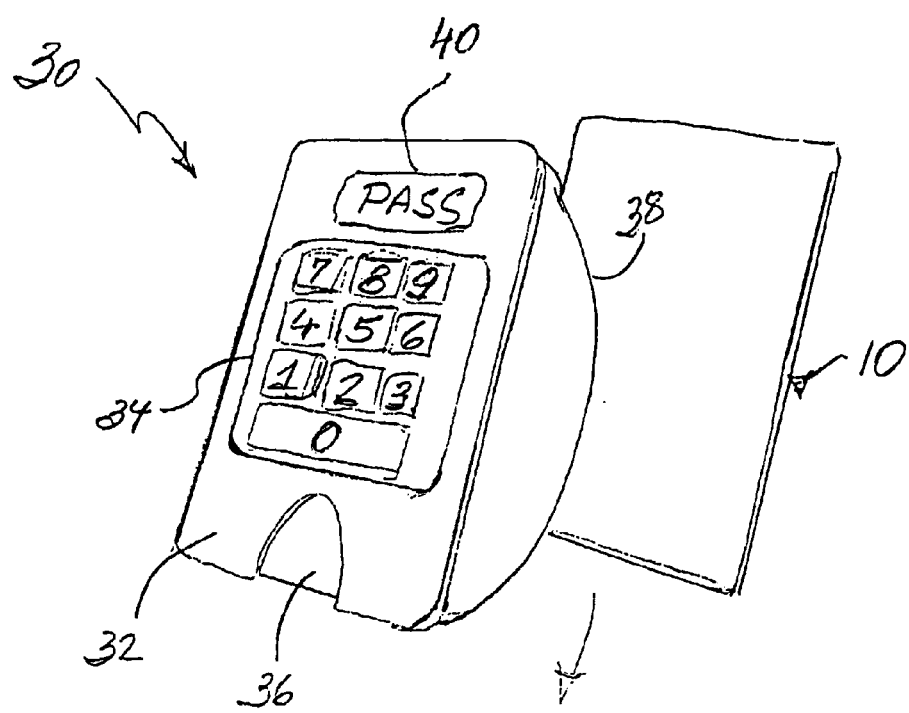

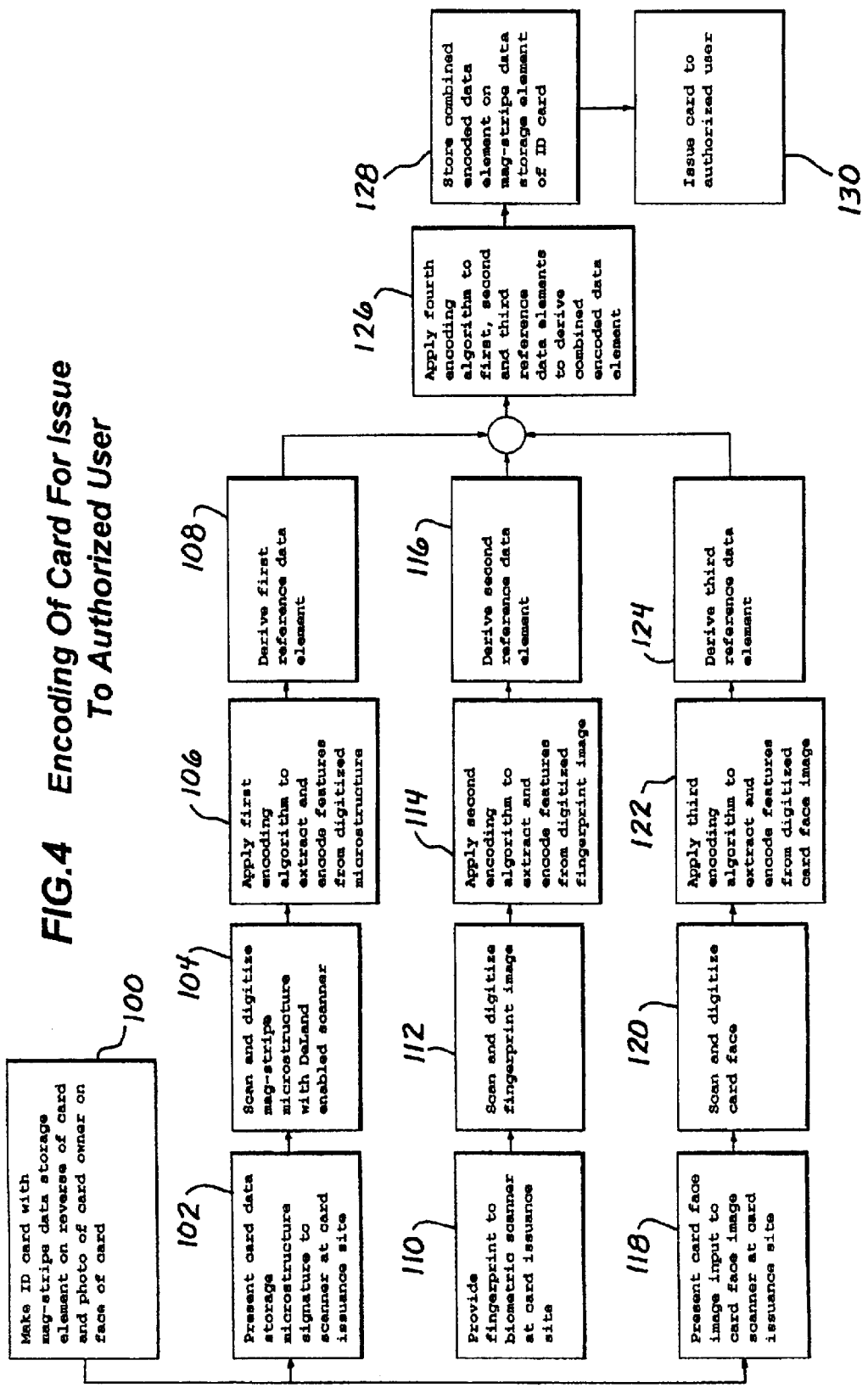
FIG.4 Encoding Of Card For Issue To Authorized User

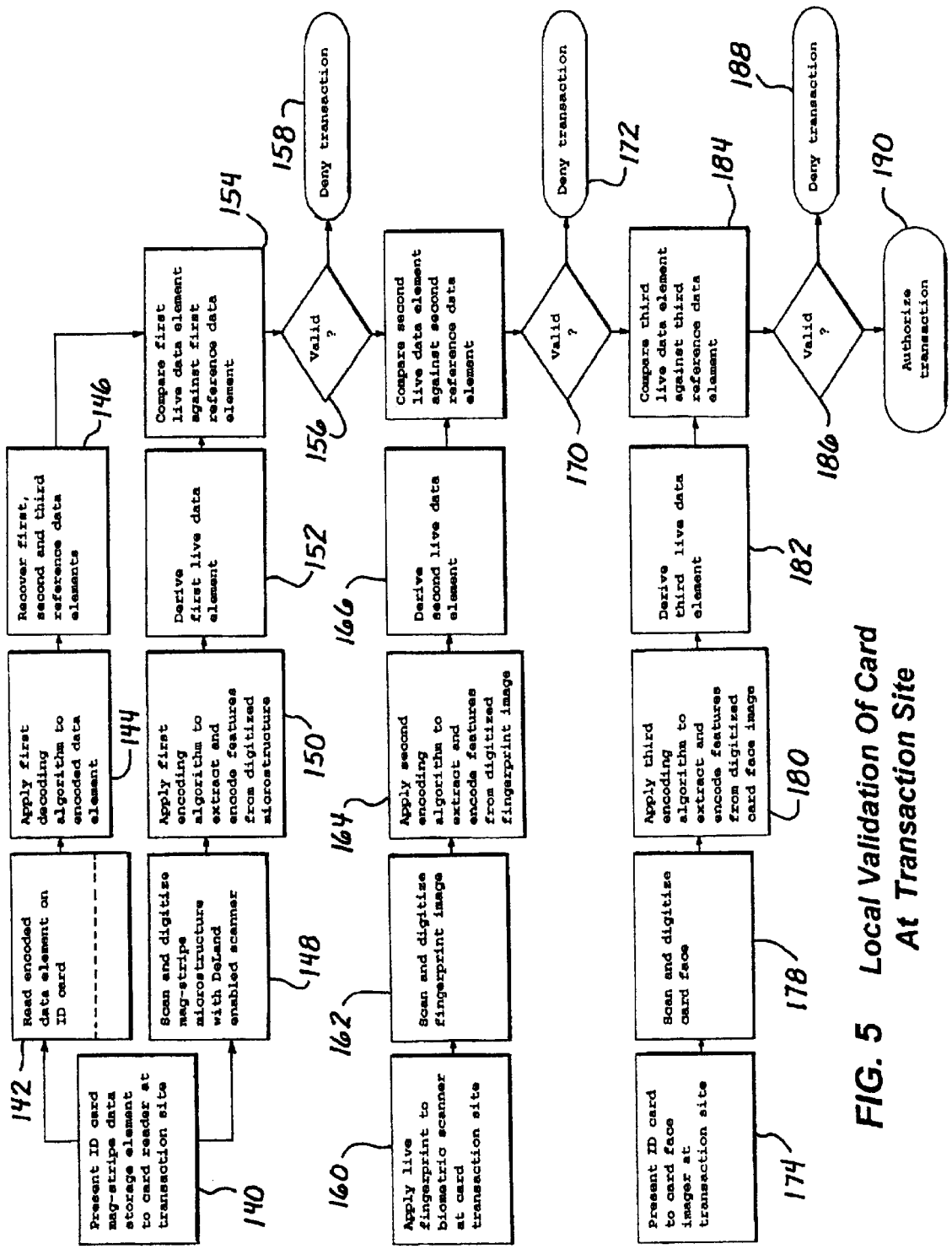
FIG. 5  Local Validation Of Card At Transaction Site

SECURITY IN MAG-STRIPE CARD TRANSACTIONS

BACKGROUND OF THE INVENTION

1. Field of the Invention

This invention pertains to the field of electronically readable personal identification and commercial transaction cards and more particularly relates to identification cards having a digital storage medium such as a mag-stripe encoded with a first reference data element uniquely identifying the storage medium on the particular card, a second reference data element identifying a unique physiological biometric aspect of the individual identified by the card, and prefereably a third reference data element representative of graphics or text displayed on the face of the card. The individual reference data elements may be encrypted in a combined encoded data element by means of an encoding algorithm, thereby to better secure the individual reference data elements against retrieval and possible illicit use by unauthorized parties.

2. State of the Prior Art

Electronically readable cards in various forms have come into widespread and rapidly increasing use for diverse purposes. In general, such cards serve to identify the bearer to persons such as security guards and electronic systems such as electronically controlled gates and automatic bank teller terminals (ATMs) and for purposes of this disclosure such cards are referred to as ID cards. ID cards may take the form of employee badges and electronic key cards for gaining physical access to restricted premises or mass transit systems, financial transaction cards such as bank credit and debit cards, or documents issued by a governmental entity such as driver licenses and passports.

Typical ID cards are rectangular sheets of laminated plastic imprinted with visually readable personal identification indicia which may include alphanumeric text with or without graphics such as a photograph of the card owner. These visually readable indicia are intended to identify the card owner to other persons without use of intervening card reader machines, and permit visual verification of the card user's appearance against the photograph on the card, and verification of the name printed on the card against other records, such as the name of a bank account owner by a bank teller, for example.

Identification cards have long been equipped with magnetic stripes to make the cards machine readable so as to expedite transactions and at the same time to make the cards more difficult to duplicate. However, the advent of low cost and readily available technology has made these so called mag-stripe cards relatively easy to counterfeit.

A relatively recent development aiming for increased security against counterfeit ID cards is disclosed in a series of patents issued to Ronald S. Indeck, including the following U.S Patents which are generally referred to as the Indeck patents in this specification:

| | |
|---|---|
| 5365586 | 11/94 |
| 5408505 | 4/95 |
| 5428683 | 6/95 |
| 5546462 | 8/96 |
| 5587654 | 12/96 |
| 5625689 | 4/97 |
| 5740244 | 4/98 |

The Indeck patents disclose a method by which the magnetic storage stripe on each card may be uniquely identified by reading minute random variations in the distribution and orientation of magnetic particles along the surface of the magnetic stripe. The magnetic stripes consist of fine particles of magnetic material bound in a plastic matrix. When examined on a sufficiently small scale it is found that the distribution of the magnetic particles is random. This random distribution can be read as an electronic signal or noise in a suitably modified card reader, and the signal serves as a unique fingerprint of a particular magnetic stripe element. The microstructure of a selected portion of the card's magnetic stripe can be represented in digital form, i.e. digitized, and stored on the card's magnetic stripe, thereby enabling authentication of the card as the true original distinguishable from, for example, a fraudulent card imprinted and magnetically encoded with the same information as the original but having a magnetic stripe with a different microstructure. U.S. Pat. No. 6,098,881 issued to DeLand, Jr, et al., and entitled Magnetic Stripe Card Verification System hereafter the DeLand patent, advances Indeck's invention by providing practical enabling technology designed to implement Indeck's invention in practical mag-stripe card readers. The technology disclosed in the Indeck patents and the DeLand, Jr. patent thus enables verification of a given card's authenticity with a high degree of confidence.

The Indek/DeLand, Jr. technology, if implemented in a mag-stripe card reader, can verify with a relatively high degree of assurance that a given mag-stripe card was legitimately issued by tying a given digital data storage element, i.e. a given mag stripe element, to a particular plastic card embossed and imprinted with the legitimate card owner's personal information. However, the existing technology fails to ensure that the person presenting the card at a transaction site is the legitimate owner of the card by tying the physical card to a single physical person with a comparable degree of assurance. Consequently, a much lower degree of confidence exists with regard to the identity of the person presenting a card at a transaction site. Existing cards seek to verify the identity of a card user by providing a photograph or a signature of the authorized card owner. Both of these means can be circumvented, often with little difficulty. Commercial credit and bank cards usually have no photograph because it is too difficult to obtain verifiable photographs of millions of card users. While the cards provide for the user's signature, this is often left blank or is not checked by the vendor. Also, an increasing number of transactions take place at unattended card terminals where visual comparison of photographs and signatures are not and cannot be made.

A continuing need exists for improvements in personal identification cards whereby a particular mag-stripe card can be positively associated with only one physical person and is made secure against fraudulent use by an impersonator.

Another shortcoming of present card technology is its reliance upon card verification against an off-site, remote data base, typically via a telephone line connection and even over communications satellite links. In the case of major credit cards the card data verification data base is typically hosted by a mainframe computer at a central or regional data processing center. In more localized applications, such as access control at large plant facilities or airports, many card readers are connected to a central computer for card verification and control. The need for remote card verification and transaction authorization substantially increases the cost of card based systems and also slows card based transactions because of communications delays and off-site data processing times.

Consequently, a need also exists for mag-stripe card readers and transaction terminals capable of highly reliable yet fully local verification of both card authenticity and user identity so as to facilitate implementation of widely distributed card based systems at lower cost while also speeding card based transactions.

SUMMARY OF THE INVENTION

The present invention addresses the aforementioned needs by providing a method for making more secure electronic transaction cards which are not only relatively safe against fraudulent duplication but can also be associated with a particular physical person at an electronic card reader terminal.

The method according to this invention relates to card transactions based upon the presentation of a card to an electronic card reader at a transaction site or location. The physical cards involved in these transactions may be conventional cards of laminated plastic having a front surface or face imprinted with visually readable personal identification indicia corresponding to an individual to be associated with the card and an electronically readable digital data storage medium or mag-stripe on the rear surface or reverse of the card. The visually readable indicia imprinted on the card surface may include alphanumeric indicia, such as a printed or embossed name, address, date of birth, account number and card expiration date. The visually readable indicia may also include graphic or photographic indicia such as a photograph of the individual to be associated with the identification card. These indicia may be applied to the card face by conventional embossing, printing and laminating processes, so that the face of the card has a conventional appearance.

The nature of the card transaction may include, for example, financial transactions such as payment for goods or services and banking transactions, or may be involve gaining physical access to protected premises or equipment of a facility such as an industrial plant, transportation terminal or military base.

The method of securing card transactions according to this invention can be implemented at different levels of security, depending on the requirements of a particular application.

At a first, lower, security level the novel method includes the steps of deriving at least one card authentication reference data element and a personal identification biometric data element at the time of issuance of the card to an authorized user. The presently preferred card authentication reference data elements include a first reference data element representative of random microstructure of the data storage medium on the card as disclosed in the Indeck patents and obtained, for example, with a card reader or scanner as taught by DeLand. The personal identification biometric data element is a second reference data element representative of a physical biometric aspect such as a fingerprint.

The method of this invention further includes storing or recording the first reference data element and the second reference data element on the data storage medium of the card for subsequent reading by a card reader; and verifying authenticity of the card as well as identity of the card user at a transaction location by comparing the stored first and second reference data elements against corresponding live data elements derived at the time and place of a card transaction.

At a second, higher, level of security the novel method further includes the step of deriving a second card authentication reference data element representative of visually readable indicia displayed on the face of the card. This third reference data element may be a digital representation of an optically scanned image of a photograph or signature of the authorized card user or other visually readable printed indicia on the card, usually on the face of the card.

The method of this invention preferably includes the steps of applying an encoding algorithm to the reference data elements thereby to derive a combined fourth encoded data element which incorporates the reference data elements in encoded form, such that the individual data elements cannot be retrieved by reading the card storage medium element without knowledge of the encoding algorithm, thereby effectively encrypting the reference data elements. Combining the separate reference data elements into an encoded element can also reduce the amount of digital data which is stored in the limited storage capacity of the card's data storage medium.

In the presently preferred form of the invention the reference data elements are stored or recorded on the mag-stripe data storage medium of the card at the time of issuance of the card to an authorized card user, for comparison against the corresponding live data elements derived at a later time of presentation of the card during a card transaction, to permit fully local high reliability verification of card authenticity and user identity. However, in alternate forms of the invention, one or more of the reference data elements and the encoded data element may be stored in an off-card data base, either as an alternative to or in addition to on-card storage, and the off-card storage accessed by means of a suitable communications link for verification of reference or encoded data against live data during a card transaction.

The card reader or readers used to verify card authenticity at the transaction location is programmed with a decoding algorithm which operates to extract and retrieve the individual first, second and third reference data elements by decoding the combined encoded data element in the course of a card transaction. The card reader is equipped with suitable logic circuits and associated program instructions designed to make a comparison of the corresponding reference and live data elements and to provide an authorizing or go no go decision output depending on whether or not a positive match is obtained validating all of the compared data elements, so as to simultaneously authenticate the card and verify the identity of the card user at each presentation of the card before a transaction is authorized.

The card reader unit for use with the method of this invention is modified from conventional mag-stripe card readers to include hardware and logic subsystems for deriving live data elements and verifying each of the card validation and identity verification reference data elements against the corresponding live card data obtained at the time of the card transaction. One of the card verification subsystems is a microstructure reader adapted to derive a first live data element for each card presented to the reader representative of the microstructure of the digital data storage medium of the card at the transaction site, so as to enable the card reader to verify mag-stripe authenticity according to the DeLand method. An identity verification subsystem is a biometric scanner configured for deriving a second live data element in the form of a biometric characteristic of the physical person of the individual presenting the card at the transaction site. Another card verification subsystem may be an optical scanner arranged for imaging some or all of the card, such as the card face, to derive a third live data element for verification against a stored third reference data element.

The biometric aspect of the card user's physical person to be identified may be a fingerprint, the shape of a hand, a retinal pattern, a voice pattern or a signature pattern, among still other physical or behavioral aspects suitable for encoding as a second data element on the identification card. It is desirable to also ascertain that the biometric aspect is derived from live anatomy as a further safeguard against fraud. This may be accomplished by known methods including finger pulse recognition.

A procedure for verification of card authenticity and user identity may entail the steps of reading a unique microstructure characteristic of the storage element of a presented card; comparing the microstructure characteristic against the first reference data element contained in the encoded data element stored on the card; upon finding a positive match accepting live biometric input from the card user; extracting a biometric characteristic from the biometric input; comparing the biometric input against the second data element contained in the encoded data element; and upon finding a positive match providing an authorizing output.

In the preferred form of this invention all reference data elements are stored or recorded on the data storage element of the card, whether the data elements are stored in individual form or combined in an encoded data element. The on card availability of the reference data elements and encoded data element permits fully local verification of live card and biometric data at the transaction site, thereby eliminating the need for telecommunication between every card reader and a central data storage and processing site. A high degree of security of the stored reference data is provided by first encoding each reference data element individually and then again encoding the once encoded reference data elements into an encoded combined data combining all the data elements.

The encoding algorithm for deriving the encoded data element may include the steps of separating each of the reference data elements into a plurality of sub-elements and intercalating the sub-elements according to an encoding formula or algorithm, such that the encoded data element contains the combined sub-elements of each reference data elements but the combined sub-elements cannot be separated and the individual reference data elements reconstituted from the encoded data element without knowledge of the encoding formula or algorithm, whereby the reference data elements are effectively encrypted on the storage medium of the card.

These and other features, improvements and advantages of the present invention will be better understood by reference to the following detailed description taken in conjunction with the accompanying drawings.

BRIEF DESCRIPTION OF THE DRAWINGS

FIG. 3 is a perspective view of a typical stand-alone ID card reader equipped with a fingerprint scanner.

FIG. 4 is a diagram depicting the processing of the three different raw reference data inputs into a single encoded data element for storage on the mag-stripe upon issuance of the card; and FIG. 5 is a diagram depicting the steps involved in card verification in the course of a card transaction.

DETAILED DESCRIPTION OF THE PREFERRED EMBODIMENTS

Figure 1:
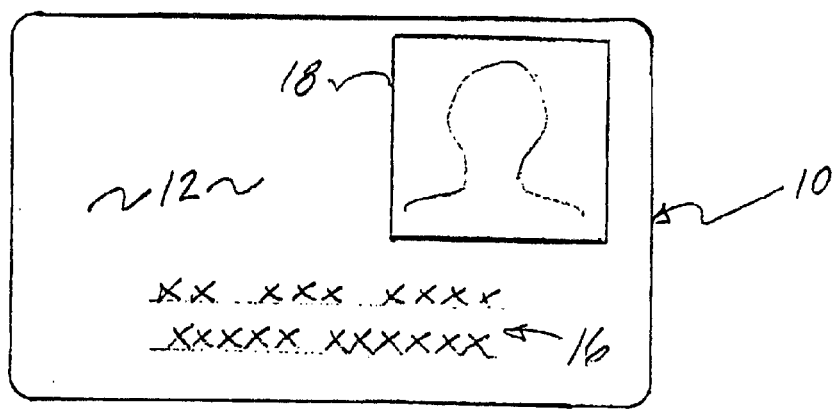
FIG. 1 is a front view of a typical transaction card imprinted with visually readable alphanumeric and graphic indicia.

With reference to the accompanying drawings wherein like elements are designated by like numerals, FIG. 1 shows a personal identification card or ID card 10 which is a generally rectangular sheet of thermoplastic material. The card 10 has a card front surface or face 12 and a card rear surface or reverse 14. Standardized card dimensions for bank and credit cards are 3.375 inches in length, 2.125 inches in height and 0.030 inch thick, although other types of cards may have other physical dimensions which for purposes of this invention are not critical.

Figure 2:
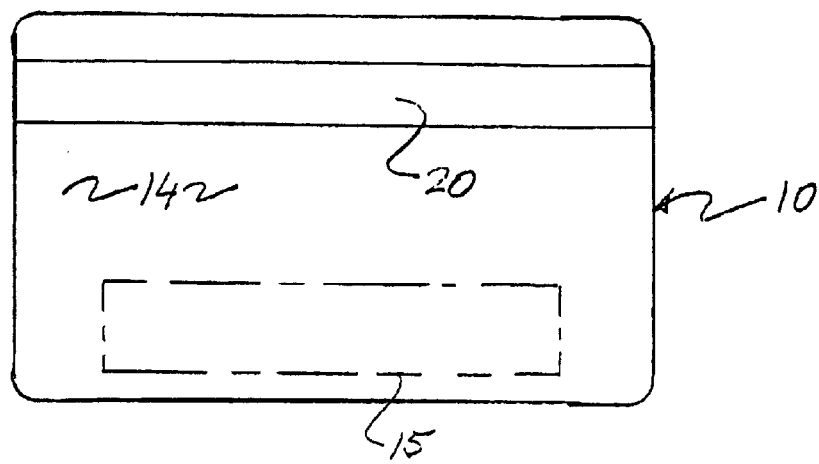
FIG. 2 is a rear view of the ID card of FIG. 1 showing the magnetic stripe for storage of data in digital form.

Each ID card 10 is issued to a specific person or legitimate card owner by an issuing entity. The card 10 is individualized to the legitimate owner by visually readable indicia imprinted on the face of the card which indicia are readable or viewable by a person without the aid of a machine. The readable indicia may include alphanumeric text 16 representing the name of the legitimate owner as well as card number and expiration date, and graphic images such as a head shot photograph 18 of the legitimate card owner. The text 16 may be embossed on the card in an area provided for embossed characters and suggested by numeral 15 in FIG. 2. Additional non-embossed textual and graphic material is often found on either or both the card face and reverse, to identify the entity issuing the card or simply to embellish the card. FIG. 2 depicts the reverse side 14 of the same card 10 to which is permanently affixed a data storage element in the form of magnetic stripe or mag-stripe 20. The mag-stripe extends the full length of the card and includes a layer of magnetizable material, usually a metal or metal oxide particulate suspended in a polymer matrix.

Digital data is written to and read from the mag-stripe 20 with electronic card readers which are commercially available from many vendors. The data is written in the form of magnetic patterns which by industry convention are confined to a standard format on the surface of the mag-stripe. The current or standard density magnetic stripe data recording specification for financial transaction cards, maintained by the American National Standards Institute, 11 W. $42^{nd}$ St., New York, N.Y. 10036, provides for three parallel data tracks along the length of the stripe 20, each track 0.110" wide with 79 alphanumeric characters in the uppermost track one, 40 numeric characters in middle track two and 107 numeric characters in lower track three. At this time, a new high density magnetic stripe standard is being formulated. The new high density format under development is believed to provide for five or six data tracks with higher, but as of yet undefined, character storage capacity per track than the standard format.

This invention improves over prior methods of conducting card based transaction by providing at least two and preferably three reference data elements at the time of issuance of the card which are verifiable at each card transaction. The reference data elements, in combination, afford a considerable improvement in the security of card based transactions, and in particular enable highly reliable and fully local verification of both card authenticity and user identity at the card transaction site.

The flowchart of FIG. 4 shows the steps by which a high security card is encoded with reference data elements for issue to an authorized card user. A card 10 including an electronically readable data storage element such as a mag-stripe 20 is made as by conventional card manufacturing processes in step 100 of FIG. 4. As already indicated, the card 10 may be entirely conventional in its physical construction.

A first reference data element, derived in steps 102 through 108, enables authentication of the card by identification of a physical characteristic unique to the data storage element on each identification card, such as the mag-stripe of the card. In the case of a mag-stripe card the first process involves the derivation of a digital signature representative of random microstructure of the magnetic medium along the mag-stripe 20 as disclosed in the Indeck patents. A presently preferred method of accomplishing this is disclosed by DeLand, Jr. et al. in U.S. Pat. No. 6,098,881 (hereafter the DeLand '881 patent), which is incorporated into this disclosure as if fully set forth herein. In general the derivation of this digital signature entails, in step 102, scanning a portion of the magnetic stripe 20 with a card reader suitably modified for this purpose in accordance with the teaching of the DeLand '881 patent. This micro-scanning produces an analog noise signal representative of the random orientation and distribution of magnetic particles along the mag-strip 20. This analog signal or a selected portion thereof is digitized, i.e. converted to a digital format by the card reader in step 104. The digitized information is processed, either subsequent to or concurrently with the digitizing step, by means of a first encoding algorithm which operates to extract and encode a subset of selected features from the larger amount of information obtained by the scanning step 102. For clarity, this encoding is shown as a separate step 106 subsequent to digitizing in step 104, resulting in derivation of the first reference data element in step 108 to provide the desired digital signature. The digital signature uniquely identifies the magnetic stripe element 20 of each card 10 because the random particle distribution does not repeat from one magnetic stripe to another. Use of this digital signature effectively prevents fraudulent duplication of cards even if the printed information as well as the digitally stored information is identical on the duplicate card, because the microstructure signature of the magnetic stripe of the duplicate card will be different from the signature on the legitimate original card, and this difference is detectable with the modified card reader. The magstripe 20 is permanently bonded to the card 10 in a way which effectively prevents a stripe from being removed from one card 10, erased of its digital information, and applied to another card. As a result, the authenticity of a given magnetic stripe card 10 can be verified with a high degree of confidence by deriving a live digital signature of the card's mag-stripe at every presentation of the card to a card reader, and comparing this "live" signature with the reference data previously stored at the time of issuance of the card. This first reference data element therefore securely ties the digital storage medium, i.e. the mag-stripe 20, to a particular card 10.

A second reference data element, derived in steps 110 through 116, entails the derivation of a biometric signature representative of a selected physical or behavioral characteristic or trait of the legitimate card owner's person. This physical characteristic may be a digital representation of a fingerprint, retina, face, hand, or DNA, or a behavioral trait such as the person's voice pattern or signature, to name only some of the traits and characteristics generally recognized as sufficiently unique to every person as to serve as positive identification of the individual. Still other unique traits are known and more are being discovered, and this invention is not limited to any particular trait or group of traits. Any sufficiently unique personal characteristic which can be read or scanned and represented in digital form may be used. For purposes of the following explanation, the selected biometric aspect or characteristic is a fingerprint of the legitimate card owner.

The derivation of a digital representation of a fingerprint is readily achieved using commercially available fingerprint scanners and is a well understood process. Such scanners may be optical or capacitive scanners, and feature a scanning surface or platen against which the finger is applied for scanning. The biometric input, i.e. the user's fingerprint, is applied to the platen of a fingerprint scanner in step 110. The scanning process and the conversion of the scanned information into digital form in step 112 is well known and need not be explained in detail here. A considerable body of technology exists relating to optical fingerprint scanning and identification, and for purposes of this disclosure it suffices to say that the end product or output of the fingerprint scanning is a digital representation of some portion of the person's fingerprint pattern. In step 114 a reference digital fingerprint data element is derived by extracting a number of predetermined features from multiple scanned images of the fingerprint. Extraction of multiple features is necessary because the fingerprint image changes depending on the orientation of the finger against the platen of the image scanner and thus is unlikely to repeat exactly from one scan to the next. Instead, a number of smaller features are identified and digitally encoded by means of a biometric encoding algorithm to derive a relatively compact biometric reference data element in step 116.

A third reference data element is derived in steps 118 through 124 by presenting the card face 12 to a suitable optical scanner at the card issuance site in step 118, optically scanning the card face 12 or some portion thereof and digitizing the scanned image in step 120, and applying a third encoding algorithm in step 122 to extract and encode a set of features selected from the scanned card face image data. The output of the third encoding algorithm results in the third reference data element in step 124, which is in effect a digital signature of the card face of the particular card 10. For example, the area of the card face bearing the photograph 18 of the legitimate card user may be scanned for this purpose and a digital data element derived from the scanned image by means of a suitable card face encoding algorithm. This third encoding algorithm may include extraction of features of the optically scanned image analogously to the extraction of features in the derivation of the biometric fingerprint reference element.

The third reference data element in effect serves to verify some or all of the visually readable indicia or information on the face of the card. Of particular usefulness is verification of the card owner's photograph on the card face. If the photo on the card is verified as authentic, then it may also be used to make a visual comparison of the card users personal appearance against the photograph if the transaction site is staffed with live personnel, as in a department store or restaurant, as opposed to unmanned card reader stations such as found at entry gate control card readers. However, even without such visual comparison, verification of the card face provides a further measure of confidence in the authenticity of the card presented to the reader at the transaction site. Verification of the card photo 18 is particularly desirable in personnel identification cards to ensure that an otherwise valid identification card has not been altered by mere substitution of a new photograph to match the appearance of an unauthorized user. Such simple alteration may otherwise suffice for an intruder to gain unchallenged admittance to restricted premises even if the intruder's appearance is checked against the card photo after entry is effected through a controlled gate by means of the altered card.

The three reference data elements of steps 108, 116 and 124 are then fed as inputs to a fourth encoding algorithm in step 126 to obtain a combined encoded data element. Step 126 provides a further degree of encryption of the three reference data elements so that none of the reference data elements can be extracted from the combined encoded data element without knowledge of the fourth encoding algorithm. Step 126 may also result in reduction of the reference data elements into a more compact combined encoded data element which requires less storage space on the data storage mag-stripe element of the card than would the three reference data elements individually. The combined encoded data element is then stored in the data storage element, i.e. written on mag-stripe 20 of card 10 in step 128, and the encoded card 10 is then issued to the authorized user of that particular card 10 as the final step 130 in the card issuance process. The combined encoded data element is written in any available space on the mag-stripe. The choice of location will depend on the particular card application. For example, bank cards have a mag-stripe data format which leaves the third track blank, while travel cards leave the second data track blank.

The particulars of the first, second, third and fourth encoding algorithms mentioned above are not and need not be included here as suitable algorithms can be readily constructed or selected by those having ordinary knowledge and skill in electronic card technology. Furthermore, such encoding algorithms are proprietary to commercial vendors of electronically readable card identification systems and the security of their commercial card identification systems depends largely upon maintaining confidentiality of the encoding algorithms used. Disclosure of the encoding algorithms in effect destroys the card security system.

The card 10 is carried on the person of the card user and the card is physically presented to electronic card reader units located at the sites where card based transactions are to be carried out. In general, for purposes of this disclosure, a card transaction is any process which is conditioned upon verification of an electronically readable card presented by a card user at a transaction site. These transactions may be commercial transactions or may involve nothing more than identification of the card user for some administrative process, such as admission into restricted premises through an electronically operated gate, passage through a passport control authority, or identification to a law officer, among many other possible types of card transactions.

Authorization or completion of a given card transaction is conditioned upon verification of both card authenticity and user identity. In a preferred form of the invention at least the first and second reference data elements encoded in card 10 are tested against corresponding first and second live data elements obtained by means of a suitable card reader at a transaction site where the card is presented by a card user. The card user presenting the card at the transaction site may or may not be the same person as the legitimate card owner to whom the particular card was originally issued by the issuing entity, and therefore the identity of the card user as the legitimate card owner is verified as a precondition to authorization of the requested transaction. A typical card reader unit 30 is illustrated in FIG. 3. The depicted card reader 30 is only exemplary as the packaging and configuration of a card reader can vary widely depending on many factors. The card reader may be a built into a wall, configured as a desktop unit, or packaged for portable use. The reader 30 has a reader housing 32, an optional numeric keypad 34 through which a card user may enter a personal identification number (PIN number) to further verify his or her identity, a fingerprint scanning platen 36, a card reader slot 38 and a display 40. A card 10 is presented to the reader by sliding or swiping the card through the card slot 38 as suggested by the arrow in FIG. 3. The card reader slot 38 guides the card across a mag-stripe read head (not shown) internal to the reader housing 32 and connected to suitable signal and data processing circuits adapted for reading data stored on the mag-stripe 20. The card reader 30 is also enabled for scanning and digitizing a signal representative of the microstructure of the mag-stripe 20 in accordance with the teaching of the previously referenced DeLand, Jr., '881 patent.

The reader 30 also includes an optical image scanner, suitably integrated in the card reader housing 32 or mounted adjacent thereto, and which may be of the card insertion type which draws the card across an optical image sensor which scans all or a portion of the card face 12, including photograph 18. The card face scanner may also be integrated with the mag-stripe reader such that both the card face 12 and the mag-stripe 20 on the reverse side 14 of the card are scanned and read simultaneously, and live input is simultaneously obtained from the card 10 for the three different data elements.

The validation process by which a given card 10 is authenticated and the identity of the card user verified is flow-charted in FIG. 5.

A typical card transaction with a mag-stripe card improved according to this invention involves the steps of presenting the card to a card reader 30 at the transaction site in step 140, typically by inserting or swiping the card through a card reader unit by a card user. Swiping the card through slot 38 results in simultaneous reading of data stored on the mag-stripe in step 142 and also micro-scanning of the magnetic recording medium in step 148 in accordance with the DeLand, Jr. process. The data read in step 142 includes in particular the combined encoded data element stored on the mag-stripe 20 which in step 144 is deconstructed by data processor circuits operative for decoding, by means of a first decoding algorithm. In step 146 reader 30 operates to extract, separate and store in card reader memory the first, second and third reference data elements from the combined encoded data element. The card reader 30 also operates to derive first, second and third live data elements which are compared or tested against the respective first, second and third reference data elements recovered by the reader from the presented card. The first live data element is derived in steps 148 through 152; the second live data element is derived in steps 160 through 166; and the third live data element is derived in steps 174 through 182.

In step 148 the card reader scans the microstructure of the mag-stripe magnetic medium, as already explained, and also digitizes the resulting signal. In step 150 the encoder applies a first encoding algorithm, which normally will be the same first encoding algorithm applied in step 106 in FIG. 4 during initial pre-issuance encoding of the card 10, to derive the first live data element in step 152.

The reader 30 then verifies card authenticity by obtaining a live first reference data element, by logically comparing in step 154 the first live data element against the first reference data element decoded from the card by the reader. If the comparison of live and reference data elements is valid, i.e. the two data elements are found in step 156 to be the same or sufficiently similar above a preset threshold of similarity, the transaction proceeds to step 160 wherein the card user is asked to provide a live biometric sample, which in the embodiment being described involves the scanning of a finger, e.g. application of the user's right thumb to the scanner platen 36. The sample fingerprint is scanned and digitized in step 162, and the digital information so obtained is operated upon by a second encoding algorithm, which normally will be the same second encoding algorithm applied in step 114 of FIG. 4, executed by suitable logic subsystems such as one or more embedded data processors of reader 30 in order to derive a live fingerprint data element in step 166. The live second data element is derived by application of the second encoding algorithm to a digitized image of the fingerprint, and is then compared or otherwise tested in step 168 against the second reference data element retrieved from the card 10 by the reader. This comparison or testing will usually involve a statistical evaluation of the live and reference elements because, as previously mentioned, no two fingerprint scans are likely to yield the same image, and therefore the comparison must be based on degrees of similarity, i.e. the percentage of similar features found in the live versus the reference scans. A comparison or test is deemed successful and the live fingerprint valid in step 170 if the live image is found to exceed a predetermined percentage, e. 70%, of features in the fingerprint reference data element. The predetermined percentage sets a threshold level of security. A greater percentage of features identified in both live and reference data elements clearly provides a higher degree of assurance of positive identification of the card user. This, however, must be balanced against practical considerations such as the need to accept partial or otherwise imperfect fingerprint images taken by the card reader, so that a lower degree of confidence in the fingerprint comparison is usually accepted as a trade-off for ease of use of the card reader. Suitable hardware and software for performing this comparison is well known and available in the industry.

Depending on the type of card transaction involved the card verification process may stop at this stage. If both the live mag-stripe and live fingerprint data are found valid in steps 156 and 170, the card transaction is authorized by the card reader. If either the live mag-stripe or the live fingerprint data fail the comparison against their corresponding reference data elements and thus prove invalid in either steps 156 or 170, the card transaction is denied in steps 158 or 172, respectively. Success or failure of the card validation process may be visually indicated to the card user on display 40 of the card reader by display of appropriate text. Audible or other feedback may be provided also.

For card transactions requiring a higher degree of security, the validation process in FIG. 5 may proceed to a third stage involving testing of the third reference data element. To this end the card reader optically scans the card face of the presented card in step 174. This step may be separate from or concurrent with step 140, if as previously explained the card face is scanned simultaneously with reading of the mag-stripe when the card 10 is presented to the reader slot 28. The scanned image is digitized in step 178 and a third encoding algorithm is applied to the digitized card face image, to derive the third live data element in step 182. The third encoding algorithm will normally be the same third encoding algorithm applied in step 122 of FIG. 4. The live third data element is then tested or compared in step 184 against the reference third data element retrieved by the card reader from the card. If the test or comparison is successful in validating the live third data element in step 186, the card transaction is authorized in step 190; if not, then the card transaction is denied in step 188 even if the live first and second data elements were validated in steps 156 and 170.

The selection of higher or lower degree of security can be made at each transaction site by appropriate setting or presetting of hardware or software of the card reader. All three first, second and third reference data elements may be available on the card 10, but for transactions where a lower level of security is acceptable only two of the reference data elements need be verified against corresponding live data. Verification of all three data elements provides a high level of confidence in the authenticity of both card and the identity of the card user at the transaction site. It should be understood that the data elements need not be verified in any particular order or sequence at the card reader 30, and that the validation process may be limited to testing for validity any two of the first and third reference data elements along with the second reference data element in card transactions where a lower level of security suffices. Either the first or the third reference data elements alone suffices to validate authenticity of the card, although at a somewhat lower degree of security than validation of all three elements. Validation of the second or biometric reference element is necessary in order to verify the identity of the card user apart from authentication of the card itself. In alternate forms of the invention, the mag-stripe card may be encoded with only two of the three reference data elements, selected as just explained, and verification of the card for purposes of authorizing a transaction based on such an alternately encoded card then requires derivation and validation of only two corresponding live data elements.

Furthermore, the validation process at either a higher or lower level of security is fully local to the card reader 30 at the transaction site and does not require access to nor support from a remote data center. In the preferred form of the invention all the data necessary to verify both the authenticity of the card as well as the identity of the card user are stored on the card and are locally and immediately available to the card reader. This reduces operating costs in that no telecommunication service is required between the card reader and a remote data center, and also eliminates a source of unreliability arising from either the telecommunications link or the remote data center being down and unavailable for a period of time. Finally, the speed of execution of the card transaction is increased in that there is no delay caused by retrieval of remotely stored data.

In alternate forms of this invention, however, one or more of the reference data elements may be stored in a data base remote to the transaction site but accessible to the card reader 30 or in the reader 30 itself, rather than incorporated in the combined encoded data element of steps 126, 128 on the card 10. In these alternate embodiments the off-card reference data elements are retrieved individually from off-card storage but are used for comparison against corresponding live data elements as in steps 154, 168 and 184 to validate the card and identify the card user. In yet another form of the invention, the combined encoded data element of step 126 is stored off-card, and is retrieved from the off-card storage in step 142 instead of being read from the card.

In each of the disclosed embodiments of this invention the reliability and security of transactions based on electronically readable cards is substantially increased because the authenticity of the card is verified and also the identity of the person presenting or using the card is verified, thereby securely tying the presented card 10 to the physical person of the card user present at the transaction site. This improvement in card based transaction security is expected to greatly reduce card fraud and economic loss related to such fraud, yet is achieved at modest cost by providing the card readers with the necessary biometric, be it fingerprint scanning or other biometric data acquisition capability, and DeLand scanning capability. It will be appreciated in particular that the cards themselves require no modification, nor is modification needed to currently accepted data storage standards for data stored on the card, i.e., such as on magnetic stripes.

While reference is made throughout the specification to the DeLand patent it should be understood that this invention is not limited to any particular practical implementation of the indeck magnetic medium identification concepts, and other card scanner or reader designs can be used for this purpose and should be considered an equivalent of a DeLand enabled scanner for purposes of this disclosure.

While particular embodiments of the invention have been described and illustrated for purposes of clarity and example, it must be understood that many changes, modifications and substitutions to the described embodiments will be apparent to those having only ordinary skill in the art. Therefore, the scope of the invention is defined and limited only by the following claims.

What is claimed as new is:

1. A method for encoding electronically readable cards having a card surface with visually readable indicia corresponding to an authorized user of said card and an electronically readable digital card data storage medium affixed to said card, comprising the steps of:
    deriving a digitized first reference data element representative of random microstructure in said data storage medium;
    deriving a digitized second reference data element representative of a biometric aspect of said authorized user;
    storing each of said first reference data element and said second reference data element either on said card data storage medium or in an off-card data storage; and
    verifying by electronically comparing said first reference data element and said second reference data element respectively against a digitized first live data element representative of random microstructure in said data storage medium taken from said card presented at a card transaction site in a course of a card transaction, and against a digitized second live data element having biometric data taken by electronically scanning anatomy of a live person of a card user presenting said card at said transaction site.

2. The method of claim 1 further comprising the steps of:
    applying an encoding algorithm to said first reference data element and said second reference data element thereby to derive an encoded data element; and
    storing said encoded data element on either said card data storage medium or in off-card data storage for retrieval in the course of a card transaction.

3. The method of claim 1 wherein said digital data storage medium is a magnetic stripe.

4. The method of claim 1 wherein said biometric aspect is a fingerprint and said second data element is derived from a scanned image of a finger of the said individual.

5. The method of claim 1 wherein said visually readable indicia include alphanumeric indicia.

6. The method of claim 1 wherein said visually readable indicia include photographic indicia.

7. The method of claim 1 wherein said visually readable indicia include the name and a photograph of the said authorized user of the card.

8. The method of claim 1 further comprising the step of deriving a third reference data element representative of a scanned image of said indicia and storing said third reference data element on either said card data storage medium or in off-card storage; and verifying said third reference data element against a live third data element derived at a card transaction terminal in the course of a card transaction.

9. The method of claim 2 further comprising the steps of deriving a third reference data element representative of a scanned image of said indicia and storing said third reference data element on either said card data storage medium or in off-card storage, and also applying said encoding algorithm to said third data element with said first and said second data element thereby to factor said third data element in said encoded data element, and verifying said third reference data element against a live third data element derived at a card transaction terminal in the course of a card transaction.

10. The method of claim 8 wherein said step of deriving a third reference data element comprises the steps of scanning and digitizing an image of some or all of said card face and applying a third encoding algorithm to extract and encode features from the digitized image of said card face.

11. The method of claim 1 wherein said step of deriving a first reference data element comprises the steps of scanning and digitizing microstructure of said magnetic stripe end applying a first encoding algorithm to extract and encode features from digitized microstructure.

12. The method of claim 1 wherein said step of deriving a second reference data element comprises the steps of applying a live fingerprint to a fingerprint scanner, scanning and digitizing an image of said live fingerprint and applying a second encoding algorithm to extract and encode features from the digitized fingerprint image.

13. A method for verifying an authenticity of a mag-stripe card and verifying an identity of a card user presenting the card at a transaction site, said mag-stripe card having a card surface with visually readable indicia indicative of an authorized user of said card and an electronically readable digital data storage magnetic stripe permanently affixed to said card, said method comprising the steps of:
    deriving a first reference data element representative of random microstructure in said data storage medium;
    deriving a second reference data element representative of a biometric aspect of the person of said card user;
    deriving a third reference data element representative of a scanned image of said visually readable indicia;
    applying an encoding algorithm to said first reference data element, said second reference data element and said third reference data element thereby to derive an encoded data element;
    recording said encoded data element on said data storage medium for reading by an electronic card reader;
    comparing at least two of said first, said second and said third reference data elements against corresponding live data elements derived at a card transaction site in a course of a card transaction; and
    authorizing a card transaction if said least two of said first, said second and said third reference data elements are validated by said comparing.

14. The method of claim 13 wherein said step of verifying comprises the steps of:
    providing a card reader at a transaction location;
    presenting said mag-stripe card to said card reader;
    reading said encoded data element on said magnetic stripe of said mag-stripe card;
    applying a first decoding algorithm to said encoded data element to retrieve said first reference data element, said second reference data element and said third reference data element;
    deriving a first live data element representative of random microstructure in said data storage medium of said mag-stripe card;
    deriving a second live data element representative of a biometric aspect of the person presenting the card;

deriving a third live data element representative of a scanned image of said visually readable indicia;

comparing said first live, said second live and said third live data element against said first reference, said second reference and said third reference data element; and authorizing a card transaction only if each said live data element is validated against the corresponding reference data element and denying the card transaction if any said live data element is not so validated.

15. The method of claim 14 wherein said step of deriving a first live data element comprises the steps of scanning and digitizing microstructure of said magnetic stripe and applying a first encoding algorithm to extract and encode features from digitized microstructure.

16. The method of claim 14 wherein said card reader comprises a fingerprint scanner and said step of deriving a second live data element comprises the steps of applying a live fingerprint to said fingerprint scanner, scanning and digitizing an image of said live fingerprint and applying a second encoding algorithm to extract and encode features from the digitized fingerprint image.

17. The method of claim 14 wherein said card reader comprises a card face imager and said step of deriving a third live data element comprises the steps of scanning and digitizing an image of some or all of said card face and applying a third encoding algorithm to extract and encode features from the digitized image of said card face.

18. A method for encoding a mag-stripe card for use in electronic transactions, said mag-stripe card having a card surface with visually readable indicia associated with an authorized user of said card and an electronically readable digital data storage magnetic stripe element permanently affixed to said card, said method comprising the steps of:

deriving a first reference data element representative of random microstructure in said data storage medium by scanning and digitizing microstructure of said magnetic stripe and applying a first encoding algorithm to extract and encode features from digitized microstructure;

deriving a second reference data element representative of a biometric aspect of said card user by applying a live fingerprint of the authorized user of the card to a fingerprint scanner, scanning and digitizing an image of said live fingerprint and applying a second encoding algorithm to extract and encode features from the digitized fingerprint image;

deriving a third reference data element representative of a scanned image of said visually readable indicia by scanning and digitizing an image of some or all of said card face and applying a third encoding algorithm to extract and encode features from the digitized image of said card face;

applying a fourth encoding algorithm to said first reference data element, said second reference data element and said third reference data element thereby to derive an encoded data element; and recording said encoded data element on said mag-stripe element.

19. A method for verifying an authenticity of a mag-stripe card encoded as in claim 18 and verifying an identity of a card user presenting said mag-stripe card at a transaction site, comprising the steps of:

providing a mag-stripe card reader at a transaction location, a fingerprint scanner, and a card face imager;

presenting said mag-stripe card to said card reader;

reading said encoded data element on said mag-stripe element of said mag-stripe card;

applying a first decoding algorithm to said encoded data element to retrieve said first reference data element, said second reference date element and said third reference data element;

deriving a first live data element representative of random microstructure in said data storage medium by scanning and digitizing microstructure of said magnetic stripe and applying said first encoding algorithm to extract and encode features from digitized microstructure;

deriving a second live data element representative of a biometric aspect of the person of said card user by applying a live fingerprint of the card user to said fingerprint scanner of the card reader at the transaction location, scanning and digitizing an image of said live fingerprint and applying said second encoding algorithm to extract and encode features from the digitized fingerprint image;

deriving a third live data element representative of a scanned image of said visually readable indicia by scanning and digitizing an image of some or all of said card face with said card face imager at the transaction location and applying said third encoding algorithm to extract and encode features from the digitized image of said card face;

comparing said first live, said second live and said third live data element against said first reference, said second reference and said third reference data element; and authorizing a card transaction only if each said live data element is validated against the corresponding reference data element and denying the card transaction if any said live data element is not so validated.

20. A method for improving the security of mag-stripe card based transactions, comprising the steps of:

providing a mag-stripe card having a card surface with visually readable indicia associated with an authorized user of said card and an electronically readable digital data storage magnetic stripe element permanently affixed to said card;

deriving either a first reference data element representative of random microstructure in said magnetic stripe element by scanning and digitizing microstructure of said magnetic stripe and applying a first encoding algorithm to extract and encode features from digitized microstructure or a third reference data element representative of a scanned image of said visually readable indicia by scanning and digitizing an image of some or all of said card face and applying a third encoding algorithm to extract and encode features from the digitized image of said card face;

deriving a second reference data element representative of a biometric aspect of said authorized user by applying a live fingerprint of the authorized user of the card to a fingerprint scanner, scanning and digitizing an image of said live fingerprint and applying a second encoding algorithm to extract and encode features from the digitized fingerprint image;

applying a fourth encoding algorithm to said first reference data element and said second reference data element to derive an encoded data element;

recording said encoded data element on said mag-stripe element, providing a mag-stripe card reader at a transaction location, said card reader comprising a scanner enabled for scanning and digitizing microstructure of said magnetic stripe, a fingerprint scanner, and a card face imager;

presenting said mag-stripe card to said card reader;

reading said encoded data element on said mag-stripe element of said mag-stripe card;

applying a first decoding algorithm to said encoded data element to retrieve said either first or third reference data element and said second reference data element;

deriving either a first live data element representative of random microstructure in said data storage medium by scanning and digitizing microstructure of said magnetic stripe and applying said first encoding algorithm to extract and encode features from digitized microstructure or a third live data element representative of a scanned image of said visually readable indicia by scanning and digitizing an image of some or all of said card face with said card face imager at the transaction location and applying said third encoding algorithm to extract and encode features from the digitized image of said card face;

deriving a second live data element representative of a biometric aspect of the person of said card user by applying a live fingerprint of the card user to said fingerprint scanner at the card reader at the transaction location, scanning and digitizing an image of said live fingerprint and applying said second encoding algorithm to extract and encode features from the digitized fingerprint image;

comparing said either first or third live data element against said either first or third reference data element;

comparing said second live data element against said second reference data element; and authorizing a card transaction only if each said live data element is validated against the corresponding reference data element and denying the card transaction if either said live data element is not so validated.

21. The method of claim 20 wherein said card reader comprising a scanner enabled for scanning and digitizing microstructure of said magnetic stripe is a DeLand enabled card reader.

22. A method for encoding electronically readable mag-stripe cards having a card surface with visually readable indicia corresponding to an authorized user of said card and a magnetic data storage mag-stripe element affixed thereto, comprising the steps of:

deriving a digitized card authenticating reference data element representative of either random microstructure in said mag-stripe element or representative of a scanned image of said indicia;

deriving a digitized biometric second reference data element taken by electronically scanning anatomy of a live physical person of the authorized user of said card;

applying an encoding algorithm to said card authenticating reference data element and said second reference data element thereby to derive an encoded data element; and recording said encoded data element on said data storage medium for reading by an electronic card reader at a card transaction location.

23. A method for verifying the authenticity of a mag-stripe card encoded as in claim 22 and verifying the identity of a card user presenting said mag-stripe card at a transaction site, comprising the steps of retrieving said card authenticating reference data element and said second reference data element by decoding said encoded data element and verifying each said reference data element against a corresponding live data element derived at a card transaction terminal in the course of a card transaction.

24. A method for verifying an authenticity of electronically readable cards and an identity of a card user at a card transaction location, comprising the steps of:

providing a card having an electronically readable digital data storage medium permanently affixed to said card;

deriving a first reference data element representative of random microstructure in said data storage medium;

deriving a second reference data element representative of a biometric aspect taken by an electronic biometric scanner from a live person of an authorized user of said card;

storing each of said first reference data element and said second reference data element either on said card data storage medium or in off-card data storage;

deriving a first live data element at a card transaction, location, said first live data element being representative of random microstructure in said data storage medium;

electronically deriving a second live data element at a card transaction site, said second live data element being representative of a biometric aspect taken by an electronic biometric scanner from a live person of a card user presenting said card at said card transaction site; and verifying said first live data element against said first reference data element and said second live data element against said second reference data element.

25. The method of claim 24 further comprising the steps of:

applying an encoding algorithm to said first reference data element and to said second reference data element thereby to derive an encoded reference data element; and recording said encoded reference data element either on said card data storage medium or in said off-card data storage.

26. The method of claim 25 wherein said step of verifying comprises the step of applying a decoding algorithm to said encoded reference data element at said card transaction site, thereby to recover said first reference data element and said second reference data element.

27. The method of claim 25 wherein said step of verifying comprises the steps of applying said encoding algorithm to said first live data element and said second live data element thereby to derive a encoded live data element and verifying said encoded live data element against said encoded reference data element.

28. The method of any of claims 24 through 27 wherein said digital data storage medium is a magnetic stripe.

29. The method of claim 28 wherein each of said steps of deriving a first reference data element and a first live data element comprises the steps of scanning and digitizing microstructure of said magnetic stripe and applying a first encoding algorithm to extract and encode features from digitized microstructure.

30. The method of any of claims 24 through 27 wherein said biometric aspect is a fingerprint.

31. The method of claim 30 wherein each of said steps of deriving a second reference data element and a second live data element comprises the steps of applying a live fingerprint to a fingerprint scanner, scanning and digitizing an image of said live fingerprint and applying a second encoding algorithm to extract and encode features from the digitized fingerprint image.

32. A method for verifying an authenticity of a data storage card and verifying an identity of a card user presenting the card at a transaction site, said card having an electronically readable data storage medium affixed to said card, said method comprising the steps of:

deriving a digital first reference data element representative of random microstructure in said data storage medium;

deriving a digital second reference data element representative of a biometric aspect of the person of an authorized card user and acquired by electronic scanning of anatomy of a live physical person of said authorized card user including digital extraction and encoding of biometric features of said anatomy;

applying an encoding algorithm to said first reference data element and said second reference data element thereby to derive an encoded data element;

recording said encoded data element either on said data storage medium or in off-card data storage;

electronically verifying by digital comparison of said first and said second reference data elements against corresponding live data elements derived at a card transaction site in the course of a card transaction; and authorizing a card transaction if said first and said second live data elements are validated by said verifying.

33. The method of claim 32 wherein said step of verifying comprises the steps of:

providing at a transaction location a card reader enabled for deriving a first live data element representative of random microstructure in said data storage medium of said card and further enabled for deriving a second live data element representative of a biometric aspect of said card user present at said transaction location.

34. The method of claim 33 wherein said step of verifying further comprises the steps of:

presenting said card to said card reader;

reading said encoded data element;

applying a first decoding algorithm to said encoded data element to retrieve said first reference data element and said second reference data element;

deriving said first live data element representative of random microstructure in said data storage medium of said card; and deriving a second live data element representative of a biometric aspect taken from a live person of the card user presenting the card at said transaction location.

35. The method of claim 33 or claim 34 wherein said step of deriving a first live data element comprises the steps of scanning and digitizing microstructure of said magnetic stripe and applying a first encoding algorithm to extract and encode features from digitized microstructure.

36. The method of claim 33 or claim 34 wherein said card reader comprises a fingerprint scanner and said step of deriving a second live data element comprises the steps of applying a live fingerprint to said fingerprint scanner, scanning and digitizing an image of said live fingerprint and applying a second encoding algorithm to extract and encode features from the digitized fingerprint image.

37. A method for verifying an authenticity of a data storage card having a magnetic stripe data storage medium and verifying an identity of a card user presenting the card at a transaction site, said method comprising the steps of:

deriving a first reference data element representative of random microstructure in said data storage medium by scanning end digitizing microstructure of said magnetic stripe storage medium and applying a first encoding algorithm to extract and encode features from digitized microstructure of said storage medium;

deriving a second reference data element representative of a biometric aspect of a person of an authorized user of said card by electronic scanning of anatomy of a live person of said authorized card user including digital extraction and encoding of biometric features of said anatomy;

storing each of said first and said second data elements either on said magnetic stripe data storage medium or in off-card data storage;

providing at a transaction location a card reader enabled for deriving a first live data element representative of random microstructure in said data storage medium of said card and further enabled for deriving a second live data element representative of a biometric aspect by electronic scanning of anatomy of a live physical person of a card user present at said transaction location, presenting said card to said card reader;

deriving a first live data element representative of random microstructure in said data storage medium of said card;

deriving a second live data element representative of a biometric aspect taken from a live person of a card user presenting the card at said transaction location; and electronically verifying said first live data element against said first reference data element and said second live data element against said second reference data element.

38. The method of claim 37 wherein said biometric aspect is a fingerprint and said card reader comprises a fingerprint scanner and said step of deriving a second live data element comprises the steps of applying a live fingerprint to said fingerprint scanner, scanning and digitizing an image of said live fingerprint and applying a second encoding algorithm to extract and encode features from the digitized fingerprint image.

39. A method for verifying an authenticity of a data storage card having an electronically readable data storage medium and verifying an identity of a card user presenting the card at a transaction site, said method comprising the steps of:

deriving a first reference data element representative of random microstructure in said data storage medium by scanning and digitizing microstructure of said storage medium magnetic stripe and applying a first encoding algorithm to extract and encode features from digitized microstructure of said magnetic stripe;

providing a fingerprint scanner, applying a live fingerprint of an authorized user of said card to said fingerprint scanner, scanning and digitizing an image of said live fingerprint and applying a second encoding algorithm to extract and encode features from the digitized fingerprint image;

storing each of said first and said second data elements either in said data storage medium or in off-card data storage;

providing at a transaction location a card reader enabled for deriving a first live data element representative of random microstructure in said data storage medium of a card presented by a card user and further comprising a fingerprint scanner;

deriving a first live data element representative of random microstructure in said data storage medium by scanning and digitizing microstructure of said storage medium magnetic stripe and applying a first encoding algorithm to extract and encode features from digitized microstructure of said magnetic stripe;

applying a live fingerprint of a card user to said fingerprint scanner, scanning and digitizing an image of said live fingerprint and applying a second encoding algorithm to extract and encode features from the digitized fingerprint image;

retrieving said first reference data element and said second reference data element from said data storage on said card or said off-card data storage; and verifying said first live data element against said first reference data element and said second live data element against said second reference data element.

40. The method of claim 39 wherein said first reference data element and said second reference data element are combined in and stored as an encoded reference data element.

* * * * *